3,584,051
ARYL-SUBSTITUTED ALIPHATIC DIAMINE
COMPOUNDS
Eugene J. Miller, Jr., Wheaton, and Harlan E. Tiefenthal,
Western Springs, Ill., assignors to Armour Industrial
Chemical Company
No Drawing. Continuation-in-part of application Ser. No.
500,359, Oct. 21, 1965. This application Nov. 24, 1967,
Ser. No. 685,260
Int. Cl. C07c 91/28
U.S. Cl. 260—570.5
9 Claims

ABSTRACT OF THE DISCLOSURE

Aryl-substituted aliphatic diamine compounds having an aryl group attached to an internal carbon atom of a long chain alkyl group substituted on a nitrogen atom, the nitrogen atoms being connected by an alkylene group, useful as cationic bituminous emulsifiers.

CROSS-REFERENCE TO RELATED APPLICATION

This application is a continuation-in-part of our copending application Ser. No. 500,359, filed Oct. 21, 1965, now abandoned.

The diamine compounds of the present invention can be represented by the following structural formula:

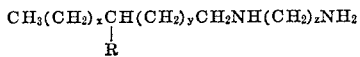

wherein $x$ and $y$ are integers from 0 to 19 and the total of $x$ and $y$ is an integer from 8 to 19, $z$ is an integer from 2 to 6, and R is selected from phenyl, naphthyl, and phenyl substituted with from 1 to 2 groups selected from methyl, hydroxy, methoxy and phenoxy. In a preferred sub-class of compounds $z$ is 3, and the other variables have the meanings previously assigned. In another sub-class $z$ is 3, $x$ and $y$ are integers from 0 to 15, and the total of $x$ and $y$ is 15.

It will be noted from the foregoing formula that the diamine compounds contain at least one long chain aryl-substituted aliphatic group, or, more specifically, an aralkyl group. In one specific embodiment, the alkyl portion of the aralkyl group contains a total of 18 carbons. In other specific embodiments, the alkyl portion of the aralkyl groups contain 11, 18 or 22 carbons. More generally, the total of $x$ and $y$, which is three less than the total of carbons in the alkyl portion of the aralkyl, may range from 8 to 19.

In the formula, R represents the aryl substituent. The carbon to which the aryl group is attached varies with the respective values of $x$ and $y$. With unsaturated alkenyl chains, such as oleyl, under most reaction conditions, the double bond migrates up and down the chain (isomerization by hydrogen ion transfer) resulting in a mixture of isomeric products. In arylating oleyl, there is a tendency for the $C_8$–$C_{14}$ and the $C_{17}$ aryl isomers to predominate, but smaller mole percentages of other isomers, such as the $C_6$, C), $C_{15}$ and $C_{17}$ isomers are also produced. The mole percent of the $C_2$–$C_5$ isomers is usually quite small or even negligible. The relative proportions of the various isomers may vary depending on the arylation process. See J. Org. Chem. 30, 885–888 (1965). However, the total of $x$ and $y$ will remain constant for the particular unsaturated chain, viz. 15 for oleyl, 8 for undecyl, 19 for behenyl, etc. By arylation, oleic acid is converted to aryl-substituted stearic acid. Similarly, palmitoleic, erucic, and 10-undecenoic acids can be converted to the corresponding aryl-substituted carboxylic acids. Ordinary commercial grade oleic acid contains several percent of palmitoleic acid, and therefore a mixture of aryl-substituted stearic and palmitic acids is obtained by arylation.

Among the preferred aryl substituents are phenyl, hydroxyphenyl, tolyl, anisyl, xylyl, cresyl, resorcyl and naphthyl. More generally, the phenyl nucleus may be substituted with 1 or 2 groups selected from methyl, hydroxy, methoxy and phenoxy resulting in groups including methylphenyl, dimethylphenyl, methyl hydroxyphenyl, methyl methoxyphenyl, methyl phenoxyphenyl, hydroxyphenyl, dihydroxyphenyl, hydroxy methoxyphenyl, hydroxy phenoxyphenyl, methoxyphenyl, dimethoxyphenyl, methoxy phenoxyphenyl, and phenoxyphenyl.

The compounds also contain an alkylene group between the nitrogen atoms. This group may contain from 2 to 6 carobn atoms and may be straight or branched chain. Thus, the alkylene group may be dimethylene, trimethylene, tetramethylene, pentamethylene and hexamethylene, or may be branched chain such as exemplified by 2-methyl tetramethylene. Trimethylene is a particularly preferred alkylene group and thus a preferred embodiment is when $z$ equals 3.

The diamine compounds may be in the form of mono- or di-salts of acids such as hydrochloric, sulfuric, nitric, perchloric, formic, and acetic. The salt forms may be water soluble or dispersible, and therefore better adapted for aqueous systems, such as aqueous bituminous emulsions.

As previously indicated, the aryl fatty acids, such as arylstearic acid or arylpalmitic acid, may be prepared by the arylation of the corresponding unsaturated fatty acid (e.g., oleic acid or palmitoleic acid). Catalyst is ordinarily required for such arylation, as is well known in the art. For example, aluminum chloride may be employed as the catalyst. With this process, the fatty acid is preferably first converted to the cyano derivative, which is reacted with the arylating agent in the presence of aluminum chloride. The aryl cyanoaliphatic compound, by procedures well known in the art, can then be converted to the corresponding primary amine (by hydrogenation). The primary amine can then be cyanoalkylated by reaction with acrylonitrile (or other similar reagent) to obtain the cyanoalkyl (or cyanoethyl) arylalkyl amine, which can then be converted to the diamine by hydrogenation.

For direct arylation of fatty acids, other catalysts are preferred, such as activated clays, or hydrofluoric acid. A process employing HF as the catalyst is described in U.S. Pat. 2,275,312, while the use of an activated clay is described in U.S. Pat. 3,074,983. An improved HF process is described and claimed in copending application, Ser. No. 451,021, filed Apr. 26, 1965, now abandoned, entitled, "Process for Arylating Unsaturated Fatty Compounds." The arylated fatty acid can then be used to prepare the diamine compounds of the present invention. For example, phenylstearic acid (or other aryl-substituted long chain fatty acid) can be converted to the corresponding nitrile, the nitrile converted to the primary amine, and the primary converted to the diamine, as described above.

This invention is further illustrated by the following specific examples.

EXAMPLE I

Phenylstearic acid and hydroxyphenylstearic acid were prepared from commercial grade oleic acid which contained a few percent of palmitoleic acid by a Friedel-Crafts reaction using aluminum chloride as the catalyst and benzene and phenol, respectively, as the arylating agents. Thereafter, phenylstearonitrile was prepared on a continuous nitrile unit over bauxite catalyst at 280–300° C. from 1127 g. phenylstearic acid. A crude yield of 833.5 g. of phenylstearonitrile was obtained, comprising a mixture of isomers, predominately the $C_8C_{14}$ and the $C_{17}$ isomers, with lesser proportions of other isomers.

Similiarly, hydroxyphenylstearonitrile was obtained in 62% crude yield from the crude acid, and tolylstearonitrile was obtained in 87% crude yield from distilled tolylstearic acid.

EXAMPLE II

Phenylstearonitrile (591 g.), prepared as described in Example I, was reduced in a 1-liter, Parr autoclave over 2% alcohol washed Raney nickel catalyst in the presence of ammonia (150 p.s.i./30–40° C.) and hydrogen (800 p.s.i. total pressure at 125° C. for 4–5 hours). The product was obtained as a light amber oil, 582.3 g. (97% crude yield). Pure phenyloctadecylamine was obtained in 67% yield upon distillation at 183–190°/0.3 mm. The product was a mixture of isomers. Similarly, hydroxyphenyloctadecylamine was prepared in 91.5% crude yield and 81% distilled yield from distilled hydroxyphenyloctadecylnitrile prepared as in Example I.

EXAMPLE III

N-(beta-cyanoethyl) phenyloctadecylamine was prepared as follows: Acrylonitrile (61.0 g., 1.15 moles) was added slowly over 2 hours, with stirring, to a mixture of phenyloctadecylamine prepared as described in Example II (363.8 g., 1.05 moles) and 17.0 g. water at 60–70° C. The resulting mixture was then stirred at 70–80° C. for 4 additional hours. The water was separated and the product dried under reduced pressure at 60–70° C.

Analysis:
Neutralization equivalent, 401 (calc'd, 398.6)
Primary amine, nil
Secondary amine, 99.5%

N-(beta-cyanoethyl)hydroxyphenyloctadecylamine was prepared by the same procedure and resulted in a product with the following analysis:

Primary amine, 0.04 meq./g.
Secondary amine, 82%
Tertiary amine, 14.2% (456 mol. wt., $HClO_4$ titration)
Infrared, percent CN=100.4

EXAMPLE IV

N-(beta-cyanoethyl)phenyloctadecylamine prepared as described in Example III was reduced in the presence of 1% alcohol washed Raney nickel, ammonia (125 p.s.i./40° C.) and hydrogen (800 p.s.i. total pressure) at 135° in 6–7 hours, thereby obtaining phenyloctadecyltrimethylene diamine. The product was a mixture of isomers containing the $C_8$ to $C_{14}$ and the $C_{17}$ isomers.

Analysis:
Neutralization equivalent, 201 (calc'd, 201.3)
Primary amine, 53.4%
Secondary amine, 45.5%

Reduction of the N-(beta-cyanoethyl)hydroxyphenyloctadecylamine of Example III under similar conditions yielded N-hydroxyphenyloctadecyltrimethylene diamine with the following analysis:

Neutralization equivalent, 225.5 (calc'd, 209.3)
Primary amine, 48.3%
Secondary amine, 34.5%
Tertiary amine, 7.5%

EXAMPLE V

A 250 ml. three neck flask, equipped with a mechanical stirrer, thermometer, reflux condenser and addition funnel, was charged with 100 g. (0.28 mole) of tolyloctadecylamine and 4.65 ml. (4% by weight of total reaction mixture) of water. The stirred aqueous amine slurry was heated to 70–75° C. and 17.2 g. (0.324 mole) of acrylonitrile was added over a 30 minute period. The reaction mixture was maintained at 70–75° C. for an additional 2.5 hours, then stripped in vacuo to yield 95 g. of pale yellow oil, comprising N-(beta-cyanoethyl)tolyloctadecylamine.

Analysis:
Neutralization equivalent, 429 (calc'd, 408.7)
Primary amine, 3.5% (unreacted)
Secondary amine, 92%

EXAMPLE VI

In like manner, anisyloctadecylamine (80 g. 0.215 mole) was reacted with acrylonitrile (13.14 g., 0.248 mole) in the presence of 4% (by weight) water at 70–75° C. over a 3-hour period. N-(beta-cyanoethyl)anisyloctadecylamine was obtained as a pale yellow oil after stripping in vacuo in 98.5% mass yield (90.0 g.).

Analysis:
Neutralization equivalent, 431 (calc'd, 424.6)
Primary amine, 1.5%
Secondary amine, 97%

EXAMPLE VII

Similarly, naphthyloctadecylamine (40.0 g., 0.1 mole) was reacted with acrylonitrile (6.1 g., 0.12 mole) in the presence of 4% (by weight) water at 70–75° C. over a 3-hour period. N - (beta - cyanoethyl)naphthyloctadecylamine was obtained in almost quantitative yield (45.5 g.) as a pale yellow oil after stripping in vacuo.

Analysis:
Neutralization equivalent, 458, (calc'd, 458)
Primary amine, 0.81%
Secondary amine, 99%

EXAMPLE VIII

Reduction of N-(beta-cyanoethyl)tolyloctadecylamine in the presence of 2% alcohol washed Raney nickel, ammonia (125 p.s.i./40° C.) and hydrogen (800 p.s.i. total pressure) at 125–130° C. in 8 hours yielded N-(gamma-aminopropyl)tolyloctadecylamine in almost quantitative yield.

Analysis:
Neutralization equivalent, 216, (calc'd, 208.3)
Primary amine, 43%
Secondary amine, 52%

EXAMPLE IX

Reduction of N-(beta-cyanoethyl)anisyloctadecylamine under similar conditions in 4 hours yielded N-(gamma-aminopropyl)anisyloctadecylamine having the following analysis:

Neutralization equivalent, 207, (calc'd, 215)
Primary amine, 57.0%
Secondary amine, 45.9%

EXAMPLE X

Reduction of N-(beta - cyanoethyl)naphthyloctadecylamine under similar conditions over 5% Raney nickel in 4 hours yielded N-(gamma-aminopropyl)naphthyloctadecylamine having the following analysis:

Neutralization equivalent, 235, (calc'd, 232)
Primary amine, 48.0%
Secondary amine, 50.9%

EXAMPLE XI

Phenylundecylamine (150.0 g., 0.61 mole) was reacted with acrylonitrile (36.0 g., 0.68 mole) in the presence of about 4% (by weight) water at 75–85° C. over a three hour period. N-(beta-cyanoethyl)phenylundecylamine was obtained in almost quantitative yield as a pale yellow oil after stripping in vacuo.

Analysis:
Neutralization equivalent, 297, (calc'd, 300)
Primary amine, 0.5%
Secondary amine, 99.6%

Reduction of N-(beta-cyanoethyl)phenylundecylamine in the presence of 2.5% alcohol washed Raney nickel, ammonia (125 p.s.i./30° C.) and hydrogen (800 p.s.i. total pressure) at 125–130° C. in two hours yielded N-(gamma-aminopropyl)phenylundecylamine in about 95% yield.

Analysis:
  Neutralization equivalent, 153.6, (calc'd, 151)
  Primary amine, 48.7%
  Secondary amine, 54.6%

EXAMPLE XII

Phenyldocosylamine (148.2 g., 0.37 mole) was similarly cyanoethylated with acrylonitrile (21.8 g., 0.41 mole) in the presence of water (4% by weight) at 75–85° C. over a three hour period. N-(beta-cyanoethyl)phenyldocosylamine was obtained as a pale yellow oil in 97.9% mass yield.

Analysis:
  Neutralization equivalent, 463, (calc'd, 456)
  Primary amine, 2.8%
  Secondary amine, 95.5%

Reduction of N-(beta-cyanoethyl)phenyldocosylamine in the presence of 2.0% alcohol washed Raney nickel, ammonia (125 p.s.i./30° C.) and hydrogen (800 p.s.i. total pressure) at 130–135° C. in 2.5 hours yielded N-(gamma-aminopropyl)phenyldocosylamine in 93.2% mass yield.

Analysis:
  Neutralization equivalent, 237, (calc'd, 229)
  Primary amine, 50.9%
  Secondary amine, 43.2%

EXAMPLE XIII

Xylyloctadecylamine (300 g., 0.81 mole) was reacted with acrylonitrile (47.8 g., 0.9 mole) in the presence of 4% (by weight) water at 70–80° C. over a four hour period. N-(beta-cyanoethyl)xylyloctadecylamine was obtained as a yellow oil in 91.3% mass yield.

Analysis:
  Neutralization equivalent, 427, (calc'd, 423)
  Primary amine, 4.8%
  Secondary amine, 92.2%

Reduction of N-(beta-cyanoethyl)xylyloctadecylamine in the presence of 2.5% alcohol washed Raney nickel, ammonia (125 p.s.i./30° C.) and hydrogen (800 p.s.i. total pressure) at 135–145° C. in four hours yielded an almost quantitative yield of N-(gamma-aminopropyl)xylyloctadecylamine.

Analysis:
  Neutralization equivalent, 228, (calc'd, 213.5)
  Primary amine, 41.7%
  Secondary amine, 49.7%

EXAMPLE XIV

Methylhydroxyphenylstearylamine (64.6 g., 0.17 mole) prepared by arylating oleylamine with a methylhydroxyphenyl group was similarly cyanoethylated with acrylonitrile (10.5 g., 0.20 mole) in the presence of about 4% (by weight) of water at 70–80° C. over a 4 hour period. N-(beta-cyanoethyl)methylhydroxyphenylstearylamine wsa obtained as a dark oil in 97% crude mass yield.

Analysis:
  Neutralization equivalent, 437, (calc'd, 428)
  Primary amine, 0.7%
  Secondary amine, 81.5%
  Tertiary amine, 17.7%

Reduction of a portion of N-(beta-cyanoethyl)methylhydroxyphenylstearylamine produced above in the presence of 10% alcohol washed Raney nickel, ammonia (400 p.s.i./135° C.) and hydrogen (800 to 890 p.s.i. total pressure/135–145° C.) in 4 hours yielded 98% crude mass yield of N-(gamma-aminopropyl)methylhydroxyphenylstearylamine having the following analysis:

Neutralization equivalent, 242, (calc'd, 216)
Primary amine, 49.7%
Secondary amine, 34.6%
Tertiary amine, 11.7%

EXAMPLE XV

Phenoxyphenyl stearylamine (173.8 g., 0.37 mole) prepared by arylating oleylamine with a phenoxyphenyl group was similarly cyanoethylated with acrylonitrile (23.0 g., 0.43 mole) in the presence of about 2.5% (by weight) of water at 70–85° C. over a 3 hour period. N-(beta-cyanoethyl)phenoxyphenylstearylamine was obtained in a 99.5% crude mass yield.

Analysis:
  Neutralization equivalent, 463 (calc'd, 516)
  Secondary amine, 100%

Reduction of a portion of N-(beta-cyanoethyl)phenoxyphenylstearylamine produced above in the presence of 4% alcohol washed Raney nickel, ammonia (120 p.s.i./30° C.) and hydrogen (900 p.s.i. total pressure/135–145° C.) in 4 hours yielded crude mass yield of N-(gamma-aminopropyl)phenoxyphenylstearylamine having the following analysis:

Neutralization equivalent, 277 (calc'd, 265)
Primary amine, 51.8%
Secondary amine, 45.0%

While in the foregoing specification this invention has been described in relation to specific embodiments thereof and many details have been set forth for purpose of illustration, it will be apparent to those skilled in the art that the invention is susceptible to additional embodiments than those specifically disclosed herein, and that certain of the details as previously set forth can be varied without departing from the basic principles of the invention.

We claim:
1. Aryl-substituted diamine compounds represented by the formula

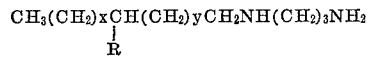

$$CH_3(CH_2)_xCH(CH_2)_yCH_2NH(CH_2)_3NH_2$$
$$|$$
$$R$$

wherein $x$ and $y$ are integers from 0 to 19 and the total of $x$ and $y$ is an integer from 8 to 19, and R is selected from the group consisting of phenyl, naphthyl, and phenyl substituted with from 1 to 2 groups selected from methyl, hydroxy, methoxy and phenoxy.

2. The compounds of claim 1 wherein R is hydroxyphenyl.
3. The compounds of claim 1 wherein R is tolyl.
4. The compounds of claim 1 wherein R is anisyl.
5. The compounds of claim 1 wherein R is naphthyl.
6. The compounds of claim 1 wherein R is phenyl.
7. The compounds of claim 1 wherein $x$ and $y$ are integers from 0 to 15 and the total of $x$ and $y$ is 15.
8. The compounds of claim 1 wherein $x$ and $y$ are integers from 0 to 8 and the total of $x$ and $y$ is 8.
9. The compounds of claim 1 wherein $x$ and $y$ are integers from 0 to 19 and the total of $x$ and $y$ is 19.

References Cited

UNITED STATES PATENTS 2,844,599  7/1958  Rendall et al. _____ 260—570.5

CHARLES B. PARKER, Primary Examiner

C. F. WARREN, Assistant Examiner

U.S. Cl. X.R.

252—311.5